US007959822B2

(12) United States Patent
Oetter et al.

(10) Patent No.: US 7,959,822 B2

(45) Date of Patent: Jun. 14, 2011

(54) MAGNETORHEOLOGICAL LIQUID

(75) Inventors: Guenter Oetter, Frankenthal (DE); Martin Laun, Mannheim (DE); Juergen Pfister, Speyer (DE); Rene Lochtman, Mannheim (DE); Gerald Lippert, Lampertheim (DE); Heiko Maas, Mannheim (DE)

(73) Assignee: BASF SE, Ludwigshafen (DE)

( * ) Notice: Subject to any disclaimer, the term of this patent is extended or adjusted under 35 U.S.C. 154(b) by 720 days.

(21) Appl. No.: 11/993,639

(22) PCT Filed: Jun. 29, 2006

(86) PCT No.: PCT/EP2006/063702

§ 371 (c)(1),
(2), (4) Date: Dec. 21, 2007

(87) PCT Pub. No.: WO2007/003580

PCT Pub. Date: Jan. 11, 2007

(65) Prior Publication Data

US 2010/0078586 A1 Apr. 1, 2010

(30) Foreign Application Priority Data

Jun. 30, 2005 (DE) ........................ 10 2005 030 613

(51) Int. Cl.
*H01F 1/44* (2006.01)
*F16F 9/53* (2006.01)

(52) U.S. Cl. ................................. 252/62.52; 252/62.55

(58) Field of Classification Search ................ 252/62.52
See application file for complete search history.

(56) References Cited

U.S. PATENT DOCUMENTS

| | | | | |
|---|---|---|---|---|
| 5,645,752 | A | 7/1997 | Weiss et al. | |
| 5,667,715 | A * | 9/1997 | Foister | 252/62.52 |
| 5,683,615 | A | 11/1997 | Munoz | |
| 5,989,447 | A | 11/1999 | Podszun et al. | |
| 6,203,717 | B1 | 3/2001 | Munoz et al. | |
| 6,547,986 | B1 | 4/2003 | Kintz et al. | |
| 6,811,717 | B2 * | 11/2004 | Iyengar et al. | 252/62.52 |
| 2004/0084263 | A1 * | 5/2004 | Kintz et al. | 188/267 |
| 2004/0119045 | A1 * | 6/2004 | Hata et al. | 252/71 |

FOREIGN PATENT DOCUMENTS

| | | | |
|---|---|---|---|
| CN | 1414075 | | 4/2003 |
| EP | 0 845 790 | A1 | 6/1998 |
| JP | 07-278142 | | 10/1995 |
| JP | 08-259986 | | 10/1996 |
| WO | WO 01/03150 | * | 1/2001 |
| WO | WO-01/03150 | | 1/2001 |
| WO | WO-02/25674 | | 3/2002 |

OTHER PUBLICATIONS

International Preliminary Report on Patentability for International Application No. PCT/EP2006/063702.

* cited by examiner

*Primary Examiner* — C. Melissa Koslow

(74) *Attorney, Agent, or Firm* — Connolly Bove Lodge & Hutz LLP

(57) ABSTRACT

A magnetorheological formulation which comprises at least one base oil, at least one magnetizable particle, a at least one dispersant and a at least one thixotropic agent is described.

14 Claims, No Drawings

MAGNETORHEOLOGICAL LIQUID

CROSS REFERENCE TO RELATED APPLICATIONS

This application is a National Phase of International Application No. PCT/EP2006/063702 filed on Jun. 29, 2006, which claims priority to Application No. 102005030613.6 filed in Germany on Jun. 30, 2005; the entire contents of which are hereby incorporated by reference.

The present invention relates to magnetorheological liquids, a process for the production thereof and the use thereof.

In general, liquids which change their rheological properties under the action of a magnetic field are referred to as magnetorheological liquids (abbreviation: MRL). They are generally suspensions of ferromagnetic, superparamagnetic or paramagnetic particles in a carrier liquid (frequently also referred to as base oil).

If such a suspension is exposed to a magnetic field, its flow resistance increases. This is due to the fact that, owing to their magnetic interaction, the dispersed magnetizable particles, for example iron powder, form chain-like structures parallel to the magnetic field lines. During the deformation of an MRL, these structures are partially destroyed, but they form again. The rheological properties of a magnetorheological liquid in a magnetic field resemble the properties of a plastic body having a flow limit, i.e. it is necessary to apply a minimum shear stress in order to cause the magnetorheological liquid to flow.

Magnetorheological liquids belong to the group consisting of the non-Newtonian liquids. Owing to their flow limit, the viscosity changes greatly with the imposed shear rate. The reversible viscosity change due to imposition of a magnetic field can take place within milliseconds.

The rheological behavior of a magnetorheological liquid can be described approximately by a Bingham model whose flow limit increases with increasing magnetic field strength. For example, shear stress values of a few tens of thousands of $N/m^2$ can be achieved at magnetic flux densities below one tesla. High transmittable shear stresses are required for the use of magnetorheological liquids in apparatuses such as shock absorbers, clutches, brakes and other controllable devices (e.g. haptic devices, crash absorbers, steer-by-wire steering systems, gear- and brake-by-wire systems, seals, retaining systems, prostheses, fitness devices or bearings).

The transmittable shear stress of a magnetorheological liquid increases with the volume fraction of the magnetizable particles. For individual applications, volume or weight fractions of the magnetizable particles of 90% or more are entirely desirable. In these cases, the individual components in the formulation, primarily base oil, dispersers, thickener and iron particles (surface character), must be tailored to one another so that, in spite of the high volume fractions of magnetizable particles, the dispersion can be handled. This is understood firstly as meaning the flowability of the formulations over a wide temperature range from about −40° C. to 200° C. which is decisive particularly for use in the automotive sector. It is necessary to aim for as low a viscosity level as possible without the action of a magnetic field, as high a flow limit as possible under a field, little sedimentation of the magnetizable particles, little tendency of aggregate and easy redispersibility after sedimentation.

WO 01/03150 A1 discloses magnetorheological formulations which, in addition to a carrier oil, comprise magnetorheological particles having an average diameter of from 0.1 to 1000 μm. In addition, the magnetorheological formulation comprises a sheet silicate which is derived from the bentonite type. These hydrophobically modified sheet silicates are used for preventing rapid sedimentation. However, according to WO 01/03150 A1, large amounts of sheet silicate are used, which is disadvantageous in low-temperature applications owing to the limited flow behavior.

U.S. Pat. No. 5,683,615 describes the use of thiophosphorus and/or thiocarbamate compounds as dispersants for magnetizable particles for improving the colloid stability.

U.S. Pat. No. 5,667,715 relates to a mixture of large and small iron particles in order to maximize the viscosity ratio with and without a magnetic field. Silicas are additionally used as thickeners here. Surfactants, such as ethoxylated alkylamines, are mentioned as dispersants. The ratio of the large to the small iron particles is from 5 to 10:1.

WO 02/25674 describes a magnetorheological paste with the use of large amounts of thickener in order to improve the sedimentation stability. However, experience shows that such formulations are unsuitable for low-temperature applications, owing to the high flow resistance.

EP 0 845 790 describes the use of magnetic particles coated with synthetic polymers and cellulose derivatives. By using these special synthetic polymers and cellulose derivatives, it is intended to improve the sedimentation stability, abrasiveness and colloid stability of the resulting magnetorheological formulation. Nevertheless, the additional use of dispersants and thickeners in the formulation is required.

A disadvantage of the known magnetorheological formulations is that they have only a limited property profile for the respective fields of use.

Thus, a multiplicity of the known magnetorheological formulations is stable over a relatively long period only at temperatures up to 100° C., whereas sufficient stability is no longer present at higher temperatures up to 150° C. In this context, stable is understood as meaning that the performance characteristics do not deteriorate as a result of thermal load. These are firstly the rheological properties, i.e. the flow behavior, without a magnetic field and under the influence of a magnetic field. Secondly, after being subjected to a thermal load for a relatively long time, the samples should show no instabilities or inhomogeneities, such as agglomeration or increased sedimentation, for example with formation of hard sediments which are no longer redispersible.

The known magnetorheological formulations are too highly viscous and solidify in amorphous form or crystallize at temperatures of up to −30° C. even without application of a magnetic field.

A further disadvantage of the magnetorheological formulations known from the prior art is that they have no reversible formulation properties on thermal cycling.

There is therefore overall a need for magnetorheological formulations which are stable over a wide temperature range and have reversible formulation properties over this entire temperature range.

In addition, magnetorheological formulations are desired which have a low viscosity even at low temperatures at −30° C. or less without application of a magnetic field, in order to ensure broad operability of the formulation even at high particle concentrations of, for example, up to 90% by weight.

Furthermore, magnetorheological formulations are desired which can be redispersed without problems after sedimentation of the magnetizable particles. Highly pigmented formulations having the abovementioned properties should be obtained in order to ensure high transmittable shear stresses on application of a magnetic field.

The known magnetorheological formulations do not fulfill the requirement profile outlined above in all respects. Either the redispersibility is poor or there is no low-temperature flow behavior in the field-free state, which may be due to an excessively high viscosity of the base oil or may be caused by the incompatibility of oil, dispersant and thixotropic agent, or the flowability in the entire temperature range is achieved only if the concentration of magnetizable particles is not too high or if less thixotropic agent is used, which in turn means sacrifices in the sedimentation stability.

Accordingly, it is the object of the present invention to provide novel magnetorheological formulations which have a preferably good property spectrum for said applications but preferably do not have the above-described disadvantages of the known magnetorheological formulations.

This object is achieved by a magnetorheological formulation.

The magnetorheological formulation according to the invention comprises the following constituents:

a) at least one base oil which is selected from the group consisting of dialkyl dicarboxylates, based on linear or branched fatty acids having chain lengths of $C_4$ to $C_{10}$ and linear or branched alcohols having chain lengths of $C_4$ to $C_{10}$; saturated polyol esters, based on neopentylglycol, trimethylolpropane or pentaerythritol; poly-α-olefins and mixtures of the above-mentioned dialkyl dicarboxylates and poly-α-olefins;

b) at least one magnetizable particle selected from the group consisting of iron powder, finely divided iron powder, such as carbonyl iron powder, gas- and water-atomized iron powder, coated iron powder and mixtures of the abovementioned magnetizable particles;

c) at least one dispersant selected from the group consisting of polymer-based dispersants and alkylphosphoric esters of long-chain alcohols or of alcohol ethoxylates of the general formula $$R_n(EO)_x$$

where n=4 to 18 and x=0 to 20, particularly preferably n=6 to 18 and x=0 to 10, in particular n=6 to 18 and x=0 to 5; and d) at least one thixotropic agent based on hydrophobically modified sheet silicates.

In a embodiment of the present invention, the magnetorheological formulation according to the invention preferably essentially consists of the above-mentioned constituents.

The individual components a) to d) comprised in the magnetorheological formulation according to the invention are defined more precisely as follows.

Base Oil

The magnetorheological formulation according to the invention comprises, as an oil, referred to below as base oil, a compound selected from the group consisting of dialkyl dicarboxylates, based on linear or branched fatty acids having chain lengths of $C_4$ to $C_{10}$ and linear or branched alcohols having chain lengths of $C_4$ to $C_{10}$; saturated polyol esters, based on neopentylglycol, trimethylolpropane or pentaerythritol; poly-α-olefins and mixtures of the abovementioned dialkyl dicarboxylates and poly-α-olefins.

It is preferable if the abovementioned base oils or the mixture of the abovementioned base oils have or has a flashpoint of greater than 150° C. and a pour point of less than −55° C. Preferably, the base oil or the base oil mixture has a water content of less than 0.5%, particularly preferably of less than 0.1%. Furthermore, the base oil or the base oil mixture has a viscosity of, preferably, less than 5000 $mm^2/s$, particularly preferably less than 3000 $mm^2/s$, in particular less than 2000 $mm^2/s$, in each case at a temperature of −40° C. At the same time, the base oil has high chemical stability at high temperature by means of iron and air, ensuring optimum use over a wide temperature range.

The base oil or the base oil mixture forms the continuous phase of the magnetorheological liquid.

If a diester based on short-chain fatty acids is used as the base oil, it is preferably a diester of the Emkarate® brands and the Priolube® brands from Uniqema, e.g. Emkarate® 1080 and Emkarate® 1090 and Priolube® 1859, Priolube® 3958 and Priolube® 3960.

If a diester based on long-chain fatty acids is used, it is preferable if diesters of the Priolube® brands from Uniqema are used, e.g. Priolube® 3967.

A further suitable diester is known under the trade name Glissofluid® A9. This is dinonyl adipate.

Further suitable diesters are diisooctyl sebacate, dioctyl sebacate and dioctyl adipate.

If a saturated polyol ester of carboxylic acids based on neopentylglycol, trimethylolpropane or pentaerythritol is used as base oil in the magnetorheological formulation according to the invention, the use of Priolube® brands from Uniqema, in particular Priolube® 3970, is preferred. Further unsaturated polyol esters are, for example, Priolube® 2065 and 2089 from Uniqema, trimellitic esters, e.g. Emkarate® 8130 and 9130 from Uniqema, and complex esters, e.g. Priolube® 1849 from Uniqema.

If a poly-α-olefin is used as base oil in the magnetorheological formulation, the use of Durasyn® 162 and of Durasyn® 164 from Amoco is preferred. The use of Durasyn® 162 from Amoco is particularly preferred.

In a further preferred embodiment of the present invention, a mixture of an abovementioned dialkyl dicarboxylate and a poly-α-olefin is used as base oil.

As already mentioned, poly-α-olefins are preferred base oils in magnetorheological formulations. This is, inter alia, because of their low viscosity at low temperatures, which means that magnetorheological formulations based on these base oils still flow at temperatures of at least −30° C. in the field-free state and can therefore be used. In comparison, ester oils, such as, for example, the diester dinonyl adipate, and the magnetorheological formulations based on these oils are frequently more viscous over a wide temperature range relevant with regard to use, which is relevant in particular at low temperatures.

According to the invention, it has now been found that the base viscosity of magnetorheological formulations in the field-free state is lower with the use of oil mixtures comprising poly-α-olefins and ester oils, in particular diester oils, than with the use of the pure oils. This surprising behavior is particularly pronounced especially at low temperatures and is advantageous, for example, for applications in the automotive sector.

Within this embodiment for the formation of the base oils, it is preferable if the proportion of dialkyl dicarboxylate is not more than 30% by weight, preferably not more than 28% by weight, particularly preferably not more than 26% by weight, very particularly preferably not more than 24% by weight, in particular not more than 22% by weight, especially not more than 20% by weight, based in each case on the oil mixture. If the dialkyl dicarboxylate is the oil component of higher viscosity in the base oil, it is furthermore preferable if the proportion of the dialkyl dicarboxylate is from 2 to 15% by weight, preferably from 3 to 14% by weight, particularly preferably from 3.5 to 13% by weight, very particularly preferably from 4 to 12% by weight, in particular from 4.5 to 11% by weight, especially from 5 to 10% by weight.

In these oil mixtures comprising poly-α-olefins, preferably diisooctyl sebacate, dioctyl sebacate, dinonyl adipate or dioctyl adipate, particularly preferably dinonyl adipate, is used as the dialkyl dicarboxylate.

In these oil mixtures comprising dialkyl dicarboxylates, preferably Durasyn® DS 164 and Durasyn® DS 162 from Amoco, particularly preferably Durasyn® DS 162 from Amoco, is used as the poly-α-olefin.

The simultaneous use of the diester dinonyl adipate and of the poly-α-olefin Durasyn® 162 from Amoco is particularly preferred.

The content of base oil in the total formulation should be preferably from 3 to 50% by weight, particularly preferably from 5 to 30% by weight, particularly preferably from 7 to 18% by weight.

Magnetizable Particles

The magnetorheological formulation according to the invention comprises at least one magnetizable particle which is selected from the group consisting of iron powder, finely divided iron powder, such as carbonyl iron powder, which is prepared from iron pentacarbonyl, water- or gas-atomized iron powder, coated iron powder, for example iron powder coated with $SiO_2$ particles, with other metals or with at least one polymer, and mixtures of the abovementioned magnetizable particles. So-called carbonyl iron powder which is obtained by thermal decomposition of iron pentacarbonyl is particularly preferred.

The shape of the magnetizable particles may be uniform or irregular. For example, said particles may be spherical, rod-like or acicular particles. The spherical shape, i.e. shape of a sphere or a shape similar to the shape of a sphere, is particularly preferred when high degrees of filling are required.

If spherical particles are used, the median diameter [$d_{50}$] is preferably from 0.01 to 1000 μm, particularly preferably from 0.1 to 100 μm, in particular from 0.5 to 10 μm, especially from 1 to 6 μm. The abovementioned orders of magnitude of the median diameter are advantageous in particular because they lead to magnetorheological formulations which have improved redispersibility and an improved flowability in the field-free state at low temperatures.

If no spherical particles are used, the median longest dimension of the magnetizable particles provided according to the invention is preferably from 0.01 to 1000 μm, particularly preferably from 0.1 to 500 μm, in particular from 0.5 to 100 μm.

If metal powder is used as the magnetizable particle, said metal powder may be obtained, for example, by reduction of corresponding metal oxides. If appropriate, the reduction is followed by a sieving or milling process. Further methods for the production of appropriately suitable metal powders are electrolytic deposition and the production of metal powder by water or gas atomization.

The use of mixtures of magnetizable particles, in particular of magnetizable particles having different particle sizes, is also preferred. In comparison with magnetorheological formulations which comprise particles having a monomodal size distribution, formulations based on particle mixtures of different particle sizes have a lower viscosity if no magnetic field is present.

Thus, in a particularly preferred embodiment of the present invention, it is intended to use substantially spherical particles which have two different diameters. It is furthermore preferred if the magnetizable particles have in each case a median diameter [$d_{50}$] of from 0.01 to 1000 particularly preferably from 0.1 to 100 μm, in particular from 0.5 to 10 μm, especially from 1 to 6 μm, and the ratio of the median diameter of the first particle type to the median diameter of the second particle type is from 1.1 to 4.9:1, more preferably from 1.5 to 4.5:1, particularly preferably from 1.75 to 4.25:1, very particularly preferably from 2 to 4:1, in particular from 2.25 to 3.75:1, especially from 2.25 to 3.0:1.

The content of magnetizable particles in the magnetorheological formulation according to the invention is preferably from 30 to 93% by weight, particularly preferably from 50 to 93% by weight, in particular from 70 to 93% by weight.

Dispersant

The magnetorheological formulation according to the invention preferably comprises a dispersant selected from the group consisting of polymer-based, in particular polyester-based, dispersants and alkylphosphoric esters of long-chain alcohols or of alcohol ethoxylates of the general formula $$R_n(EO)_x$$

where n=8 to 18 and x=0 to 20, particularly preferably n=8 to 18 and x=0 to 10, in particular n=8 to 18 and x=0 to 5, or mixtures of the above-mentioned dispersants.

If the dispersant used is a polymeric dispersant, the use of polyesters, in particular of polyhydroxystearic acid and of alkyd resins, is particularly preferred. The products Solsperse® 21000 from Avecia and Borchi® Gen 911 from Borchers may be mentioned by way of example therefor.

The dispersants are present in the formulation according to the invention preferably in an amount of from 0.01 to 10% by weight, particularly preferably from 0.05 to 3% by weight, in particular from 0.1 to 2% by weight, based in each case on the magnetorheological formulation.

Said dispersant permits good redispersibility within the magnetorheological formulation according to the invention after sedimentation of the magnetizable particles.

By using, inter alia, polymeric dispersants, good flow behavior of the magnetorheological formulation at low temperatures can be ensured even with a high load of magnetizable particles of, for example, 90% by weight. Typically, the shear stresses of 90% strength by weight formulations at −30° C. in the field-free state at a shear rate of 40 $s^{-1}$ are less than 1000 Pa, in particular even less than 800 Pa.

Thixotropic Agent

The magnetorheological formulation according to the invention preferably comprises at least one thixotropic agent based on hydrophobically modified sheet silicates.

The settling of the magnetizable particles within the magnetorheological formulation according to the invention can be minimized by forming a thixotropic network. A thixotropic network can be formed in the magnetorheological fluid of the present invention by using the abovementioned thixotropic additive. For the purposes of the present invention, it is particularly preferable if the hydrophobically modified sheet silicates are derived from the hectorite, bentonite or smectite type. The sheet silicates of the Bentone® series from Elementis are particularly preferred. In addition, Bentone® SD-1, SD-2 and SD-3, in particular Bentone® SD-3, which is an organically modified hectorite, are furthermore preferred. The thixotropic agents are present in the present magnetorheological formulation preferably in an amount of from 0.01 to 10% by weight, particularly preferably from 0.01 to 5% by weight, in particular from 0.1 to 3% by weight, especially from 0.1 to 2% by weight.

The magnetorheological liquid of the present invention may optionally comprise other additives, for example lubricants, such as Teflon powder, molybdenum disulfite or graphite powder, corrosion inhibitors, extreme pressure additives, antiwear additives and antioxidants.

The present invention also relates to a process for the preparation of the magnetorheological liquids according to the invention, according to which the magnetizable particles provided according to the invention are dispersed in a base oil, if appropriate in the presence of a thixotropic agent and of a dispersant.

In general, the preparation is effected by first initially taking the base oil or the base oil mixture and then providing it with the dispersant, thixotropic agent and, if appropriate, further additives provided according to the invention. The resulting mixture is then homogenized by means of a suitable stirring unit. Thereafter, the magnetizable particles are added and homogenization is again effected. The second homogenization, too, is preferably effected with the aid of a suitable stirring unit. Optionally, the resulting formulation is degassed under reduced pressure.

The present invention furthermore relates to the use of the magnetorheological liquids according to the invention for applications in shock absorbers, clutches, brakes and other controllable devices, such as, in particular, haptic devices, crash absorbers, steer-by-wire steering systems, gear- and brake-by-wire systems, seals, retaining systems, prostheses, fitness devices or bearings.

The present invention furthermore relates to shock absorbers, clutches, brakes and other controllable devices, such as, in particular, haptic devices, crash absorbers, steer-by-wire steering systems, gear- and brake-by-wire systems, seals, retaining systems, prostheses, fitness devices or bearings containing at least one magnetorheological liquid according to the present invention.

The present invention is explained in more detail with reference to the following examples.

WORKING EXAMPLES

1. Test Methods

A) Redispersibility:

The formulation is spun for 15 minutes in a centrifuge at 4000 rpm. Centrifugal forces of 2000 times the Earth's acceleration occur as a result. After sedimentation of the magnetizable particles, the redispersibility is tested. For this purpose, a laboratory spatula is inserted into the settled sediment and turned through 180°. The resistance to the movement of the spatula is assessed qualitatively.

B) Flow Behavior at −40° C.:

The formulation is left for 24 hours in a glass container with a screwable lid at −40° C. By tilting the glass container, the flow behavior is assessed. In addition, a laboratory spatula is inserted into the formulation and turned through 180°. The resistance to the movement of the spatula is assessed qualitatively.

C) Chemical Stability:

The formulation is left for 24 hours in a glass container with a screwable lid at 150° C. The discoloration of the base oil and the change in the viscosity of the formulation before and after thermal loading are then measured at 25° C.

Chemical changes which relate primarily to the base oil as carrier liquid are detected by means of chromatographic methods which relate to the chemistry of the base oil (e.g. gas chromatography, high-pressure liquid chromatography, gel permeation chromatography).

D) Sedimentation:

The magnetorheological formulations are introduced into a graduated test tube, and the percentage sedimentation is read at 20° C. after 28 days.

2. Preparation of the Formulation

The dispersant and the further additives absorb the oil. Thereafter, the thixotropic agent is added and homogenization is effected by means of a suitable stirring unit. Thereafter, the magnetizable iron particles are added and the batch is again homogenized with the aid of a suitable stirring unit. Optionally, the formulation is then degassed under reduced pressure.

3. Examples of Magnetorheological Formulations a) Magnetorheological formulation consisting of

- 10.5% by weight of trimethylolpropane-tricarboxylic acid ester, carboxylic acids having a chain length of C8-C10 (Priolube® 3970), as base oil;
- 85% by weight of carbonyl iron powder having an average particle size of 5 μm as magnetizable particles;
- 4% by weight of a mixture of phosphoric monoester and phosphoric diester of a C13/C15 alcohol ethoxylate having 3 ethylene oxide units as the dispersant;
- 0.5% by weight of a hydrophobically modified hectorite sheet silicate (Bentone® SD-3) as the thixotropic agent.

The formulation can be readily redispersed after sedimentation.

b) Magnetorheological formulation consisting of

- 14.2% by weight of dinonyl adipate as base oil;
- 85% by weight of carbonyl iron powder having an average particle size of 5 μm as magnetizable particles;
- 0.3% by weight of polyhydroxystearic acid (Solsperse® 21000) as the dispersant;
- 0.5% by weight of a hydrophobically modified hectorite sheet silicate (Bentone® SD-3) as the thixotropic agent.

The formulation can be readily redispersed after sedimentation, shows little tendency to undergo sedimentation, shows high transmittable shear stress and can be used in a wide temperature range of from at least −40° C. to 150° C.

c) Magnetorheological formulation consisting of

- 11.4% by weight of poly-α-olefin Durasyn® 162 as base oil;
- 88% by weight of carbonyl iron powder having an average particle size of 4 μm as magnetizable particles;
- 0.3% by weight of alkyd resin Borchi® Gen 911 as the dispersant;
- 0.3% by weight of a hydrophobically modified hectorite sheet silicate (Bentone® SD-3) as the thixotropic agent.

The formulation can be readily redispersed after sedimentation, shows little tendency to undergo sedimentation, shows high transmittable shear stress and can be used in a wide temperature range of from at least −40° C. to 150° C.

d) Magnetorheological formulation consisting of

- 11.1% by weight of poly-α-olefin Durasyn® 162/dinonyl adipate (8:2) as base oil;
- 88% by weight of carbonyl iron powder having an average particle size of 4 μm as magnetizable particles;
- 0.6% by weight of alkyd resin Borchi® Gen 911 as the dispersant;
- 0.3% by weight of a hydrophobically modified hectorite sheet silicate (Bentone® SD-3) as the thixotropic agent.

The formulation can be readily redispersed after sedimentation, shows high transmittable shear stress and can be used in a wide temperature range of from at least −40° C. to 150° C.

4. Magnetorheological Formulations Comprising Coated Magnetizable Particles

The influence of silica particles ($SiO_2$ particles) as coating material for the iron particles (CIP) on the redispersibility after sedimentation and on the flow behavior at low temperature was investigated.

The following tables show that coating of the magnetizable particles with $SiO_2$ is advantageous with regard to the redispersibility and the low-temperature flow behavior:

| Example | CIP [% by wt.] | $d_{50}$ CIP [μm] | CIP coating | Poly-α-olefin DS 162 [% by wt.] | Borchi ® Gen 911 [% by wt.] | Bentone ® SD-3 [% by wt.] | Redispersibility 15 min, 2000 g | Flow behavior −40° C. |
|---|---|---|---|---|---|---|---|---|
| 1 | 82 | 5.0 | $SiO_2$ | 15.9 | 0.6 | 1.5 | 0/+ | 0/+ |
| 2 | 82 | 6.0 | — | 15.9 | 0.6 | 1.5 | 0/− | 0/− |
| 3 | 88 | 2.0 | — | 11.1 | 0.6 | 0.3 | −− | + |
| 4 | 88 | 1.7 | — | 11.1 | 0.6 | 0.3 | − | + |
| 5 | 88 | 4.0 | $SiO_2$ | 11.1 | 0.6 | 0.3 | 0 | + |

| Example | CIP [% by wt.] | $d_{50}$ CIP [μm] | CIP coating | Diester Glissofluid ® A 9 [% by wt.] | Solsperse ® 21000 [% by wt.] | Bentone ® SD-3 [% by wt.] | Redispersibility 15 min, 2000 g | Flow behavior −40° C. |
|---|---|---|---|---|---|---|---|---|
| 6 | 85 | 2.0 | — | 14.2 | 0.3 | 0.5 | −− | 0 |
| 7 | 85 | 2.0 | — | 13.9 | 0.6 | 0.5 | −− | 0 |
| 8 | 85 | 5 | $SiO_2$ | 14.2 | 0.3 | 0.5 | 0 | ++ |

Explanations:
Redispersibility (15 min, 2000 g):
+: readily redispersible
0: redispersible
−: poorly redispersible
−−: not redispersible
Flow behavior (−40° C.):
−: solid
0: flows very slowly
+: high viscosity
++: low viscosity 5. Influence of the Thixotropic Agent on the Low-Temperature Behavior and the Redispersibility The following examples show that large amounts of thixotropic agent, in particular of Bentone® SD-3, have an adverse effect on the low-temperature flow behavior and the redispersibility.

| Example | CIP [% by wt.] | Poly-α-olefin DS 162 [% by wt.] | Borchi ® Gen 911 [% by wt.] | Bentone ® SD-3 [% by wt.] | Viscosity [mPa · s] $D = 87\ s^{-1}$ −30° C. | Redispersibility (15 min, 2000 g, 20° C.) | Flow behavior (−40° C.) | Sedimentation [%], 28 days 20° C. |
|---|---|---|---|---|---|---|---|---|
| 9* | 82 | 14.4 | 0.6 | 3 | solid** | | | 0 |
| 10* | 82 | 15.9 | 0.6 | 1.5 | 10300 | 0/+ | 0/+ | 4 |
| 11 | 85 | 14.21 | 0.29 | 0.5 | 4250 | 0/+ | ++ | 12 |

Explanations:
*: Comparative example (based on WO 01/03150)
Redispersibility (15 min, 2000 g):
+: readily redispersible
0: redispersible
−: poorly redispersible
−−: not redispersible
Flow behavior (−40° C.):
−: solid
0: flows very slowly
+: high viscosity
++: low viscosity 6. Magnetorheological Formulations Comprising Base Oil Mixtures The following formulations 12 to 14 each comprise 88% by weight of carbonyl iron powder having a median diameter of 5 μm, 0.33% by weight of Bentone® SD-3 as a thixotropic agent and 0.6% by weight of Borchi® Gen 911 as a dispersant. The viscosity of the formulation was determined at −30° C. and a shear rate of 39 $s^{-1}$.

| Formulation | Base oil | Viscosity [mPa · s] D = 39 $s^{-1}$, −30° C. |
|---|---|---|
| 12 | Poly-α-olefin Durasyn ® 162 | 12500 |
| 13 | Poly-α-olefin Durasyn ® 162/ dinonyl adipate (95:5) | 9800 |
| 14 | Poly-α-olefin Durasyn ® 162/ dinonyl adipate (90:10) | 7700 |

The following formulations 15 to 17 each comprise 85% by weight of carbonyl iron powder having a median diameter of 5 μm, 0.50% by weight of Bentone® SD-3 as a thixotropic agent and 0.29% by weight of Borchi® Gen 911 as a dispersant. The viscosity of the formulation was determined at −30° C. and a shear rate of 39 $s^{-1}$.

| Formulation | Base oil | Viscosity [mPa · s] D = 39 $s^{-1}$, −30° C. |
|---|---|---|
| 15 | Poly-α-olefin Durasyn ® 162 | 6260 |
| 16 | Poly-α-olefin Durasyn ® 162/ dinonyl adipate (95:5) | 4700 |
| 17 | Poly-α-olefin Durasyn ® 162/ dinonyl adipate (90:10) | 4800 |

Further properties relevant for use, such as the redispersibility of the formulation after sedimentation, are not adversely affected by the base oil mixtures.

We claim:

1. A magnetorheological formulation comprising a) at least one base oil which is selected from the group consisting of dialkyl dicarboxylates, based on linear or branched fatty acids having chain lengths of $C_4$ to $C_{10}$ and linear or branched alcohols having chain lengths of $C_4$ to $C_{10}$; saturated polyol esters, based on neopentylglycol, trimethylolpropane or pentaerythritol; poly-α-olefins and mixtures of the abovementioned dialkyl dicarboxylates and poly-α-olefins;

b) at least one magnetizable particle selected from the group consisting of iron powder, finely divided iron powder, gas- and water-atomized iron powder, coated iron powder and mixtures of the abovementioned magnetizable particles;

c) at least one dispersant selected from the group consisting of polyhydroxystearic acid and alkyd resin: and d) at least one thixotropic agent based on hydrophobically modified sheet silicates.

2. The magnetorheological formulation according to claim 1, wherein the dispersant is polyhydroxystearic acid.

3. The magnetorheological formulation according to claim 1, wherein the dispersant is an alkyd resin.

4. The magnetorheological formulation according to claim 1, wherein the content of dispersant in the formulation is from 0.01 to 10% by weight, based on the formulation.

5. The magnetorheological formulation according to claim 1, wherein the thixotropic agent based on hydrophobically modified sheet silicates is derived from the hectorite, bentonite or smectite type.

6. The magnetorheological formulation according to claim 1, wherein the content of the thixotropic agent based on hydrophobically modified sheet silicates is from 0.01 to 10% by weight, based on the formulation.

7. The magnetorheological formulation according to claim 1, wherein the formulation comprises mixtures of magnetizable particles of different particle sizes, substantially spherical particles which have two different diameters being used and the ratio of the median diameter of the first particle type to the median diameter of the second particle type being from 1.1 to 4.9:1.

8. The magnetorheological formulation according to claim 1, wherein the base oil used is a mixture of poly-α-olefins and dialkyl dicarboxylates.

9. A process for the preparation of the magnetorheological formulation according to claim 1, wherein the magnetizable particles are dispersed in the base in the presence of the at least one dispersant and of the at least one thixotropic agent.

10. A method of providing stable magnetorheological formulations having reversible formulation properties in shock absorbers, clutches, brakes and other controllable devices, haptic devices, retaining systems, crash absorbers, steer-by-wire steering systems, gear- and brake-by-wire systems, seals, prostheses or bearings by employing the magnetorheological formulation according to claim 1.

11. Shock absorbers, clutches, brakes and other controllable devices, haptic devices, retaining systems, crash absorbers, steer-by-wire steering systems, gear- and brake-by-wire systems, seals, prostheses or bearings containing at least one magnetorheological formulation according to claim 1.

12. The magnetorheological formulation according to claim 1, wherein the finely divided iron powder iron particles are prepared from iron pentacarbonyl.

13. The method of providing stable magnetorheological formulations according to claim 10, wherein the controllable device is a fitness device.

14. The controllable device according to claim 11, which is a fitness device.

* * * * *